Aug. 10, 1965         R. WINKLER ETAL         3,199,466
METHOD AND DEVICE FOR REMOVING DISTURBING AIR BUBBLES IN
CHOCOLATE MOLDING OR CHOCOLATE COATING MACHINES
Filed Feb. 18, 1963
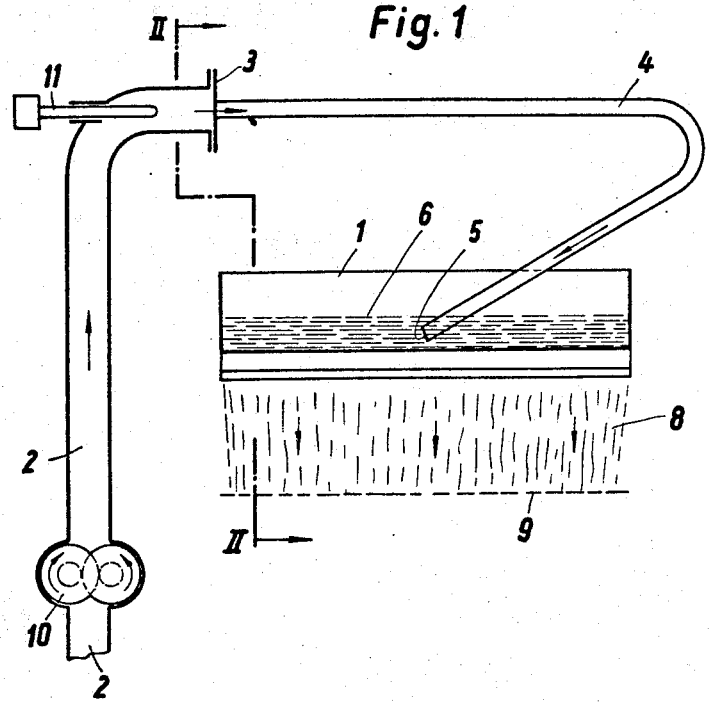
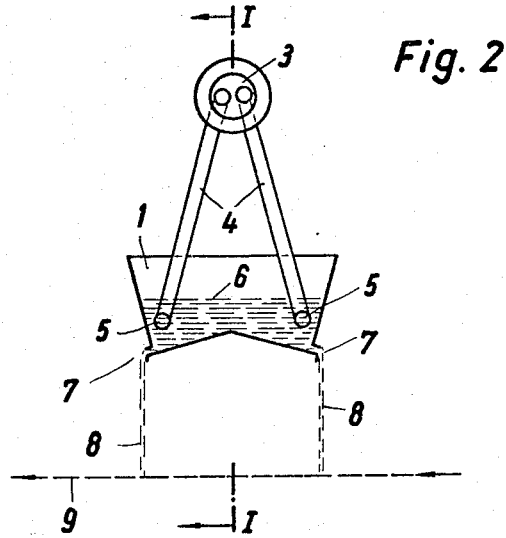
Inventors
RICHARD WINKLER
KURT DÜNNEBIER
ATTORNEYS

United States Patent Office 3,199,466
Patented Aug. 10, 1965

3,199,466
METHOD AND DEVICE FOR REMOVING DISTURB-
ING AIR BUBBLES IN CHOCOLATE MOLDING
OR CHOCOLATE COATING MACHINES
Richard Winkler, Burgermeister Wink Strasse, Rengsdorf,
near Neuwied, Germany, and Kurt Dünnebier, Renzen-
talweg 6, Wollendorf, near Neuwied, Rhineland,
Germany
Filed Feb. 18, 1963, Ser. No. 259,081
Claims priority, application Germany, Feb. 21, 1962,
W 31,711/62
6 Claims. (Cl. 107—54)

The invention relates to a method and a device for re-
moving disturbing air bubbles in chocolate molding or
chocolate coating machines.

In such machines, especially when working with choco-
late masses which are relatively viscous, disturbing air
bubbles often occur in the chocolate running into the
molds or used as coating.

Such air bubbles detract from the appearance of the
chocolate products. Furthermore, in the case of choco-
late products having a liquid filling, it is possible for such
air bubbles to cause open regions in the chocolate shell
through which the liquid filling can escape.

It has already been proposed to remove the air bubbles
by shaking the liquid chocolate in the molds before it
solidifies or, in the case of chocolate coated products,
by blowing away part of the still liquid chocolate coating
together with the air bubbles contained therein, by
means of an air blast.

If however a thick chocolate coating is required, then
the use of an air blast is undesirable. The cause for the
occurrence of air bubbles when molding chocolate or
when coating with chocolate is generally that air bubbles
are already present in the chocolate mass used for feed-
ing the chocolate tempering machine or the machine
from which chocolate is directly fed to he molds.

It is an object of the invention to provide a method
and a device for removing disturbing air bubbles in the
chocolate mass before using the same for molding.

It is a further object of the invention to provide a
device in which the chocolate mass is fed under pres-
sure to its last working station, that is to say a pouring
vessel or a vessel from which a curtain of chocolate is
allowed to fall onto articles being chocolate coated.

It is another object of the invention to provide a de-
vice in which the final rate of speed of the feed flow of
the chocolate is 7 to 15 times greater than the initial
rate of speed of the feed flow in chocolate molding and
coating machines. The surprising action of the method
according to the invention consists in that no disturbing
air bubbles can be detected in the chocolate mass flow-
ing into the pouring vessel or into the vessel from which
a chocolate curtain is released.

It can be assumed that as a result of the heavy fric-
tion of the relatively viscous mass on the walls of a nar-
row feeding pipe, strong eddy effects occur and, also
due to the high pressure to which the chocolate mass is
subjected, large air bubbles are broken up into bubbles
of such small size that they can no longer be detected
and no longer have a disturbing effect on the surface
of the prepared chocolate products.

It is yet a further object of the invention to provide
a device for performing the method, in which, accord-
ingly, a narrow supply pipe is provided on the pour-
ing vessel of a chocolate molding machine or on the
vessel which produces a chocolate curtain in the case
of a chocolate coating machine.

It is still another object of the invention to provide
a chocolate molding machine or chocolate coating ma-
chine, in which a separate pump is provided in an up-
wardly inclined pipe feeding the pouring vessel or cur-
tain vessel.

These and other objects and advantages of the inven-
tion will be clear from the following description given
with reference to the accompanying drawings, which
are given by way of example and in which:

FIG. 1 is a sectional view through part of a chocolate
coating machine, along the line I—I of FIG. 2; and FIG. 2 is a sectional view along the line II—II of
FIG. 1.

The chocolate coating machine has a stationary ves-
sel 1, which will hereinafter be termed a "curtain" ves-
sel, and which is intended for producing descending
curtain-like streams of chocolate which serve for choco-
late coating articles passing therethrough. A rising pipe
2 which is fixed in position serves for supplying tem-
pered chocolates, that is to say chocolate at a predeter-
mined temperature suitable for use in a chocolate coat-
ing machine, to the curtain vessel 1.

A narrow supply pipe 4 is connected to the pipe 2,
by means of a flange 3, and serves for the introduction
of the chocolate mass into the curtain vessel 1. As it is
evident, the reduced diameter of pipe 4 causes an in-
crease of the rate of flow of the chocolate flowing there-
in in reference to the rate of flow in pipe 2, the velocity
of the flow in pipe 2 being herein sometimes referred to
as the normal speed of flow. The internal diameter of
the pipe 4 amounts to about 15 mm. Instead of a
single pipe 4, of course a plurality of such pipes may
be connected to the pipe 2.

The outlet opening 5 of the pipe 4 advantageously lies
in the vicinity of the bottom of the vessel 1, that is to
say below the chocolate level 6 therein, so as to prevent
the introduction of additional bubbles into the choco-
late contained in the vessel 1.

The chocolate from the vessel 1 descends onto a mov-
ing conveyor grid 9 on which the articles for coating are
conveyed, after escaping from lateral slits 7 in the
bottom of the vessel 1, the slits 7 being adjustable in their
cross-section.

Advantageously, a separate pump 10 is arranged in the
pipe 2, in order to place the chocolate mass under pres-
sure. By selecting the appropriate pressure in the pipe 2
and by selecting the appropriate cross-section for the pipe
4, it can be achieved that the chocolate supplied to the
vessel 1 from the pipe 4 is substantially free from disturb-
ing bubbles. A contact thermometer 11 is provided in
the pipe 2 and serves for measuring the temperature of
the chocolate so that, if necessary, the temperature of the
chocolate being fed to the pipe 2 can be corrected.

If the feed pump provided in the tempering machine
or other processing machine which supplies chocolate
to the pipe 2 has a sufficiently great conveying rate for
the chocolate mass to be fed into the pipe 4 with the de-
sired pressure and at the desired rate of flow, then the
separate pump 10 can be dispensed with without depart-
ing from the basic concept of the invention. Further-
more, the invention can be applied with similar effect to a
chocolate molding machine, in which case the curtain
vessel 1 of FIGS. 1 and 2 would be replaced by the pour-
ing vessel which is conventionally used in chocolate mold-
ing machines.

The invention is not limited to the embodiment de-
scribed herein, many modifications, omissions, additions
and alterations being possible within the spirit and scope
of the invention as defined in the following claims.

We claim:

1. A method of liberating air bubbles contained in a
flowable mass of chocolate for coating and molding re-
spectively confections in a treatment station, said method
comprising the steps of first pressure-feeding the flowable mass along a flow path of a fixed cross-sectional area, then pressure-feeding the mass along a fixed flow path of reduced cross-sectional area, thereby increasing the rate of speed of the mass proportional to the reduction of the cross-sectional area, and finally discharging the accelerated mass below the level of a supply of flowable mass at the treatment station.

2. A method of liberating air bubbles contained in a flowable mass of chocolate for coating and molding respectively confections in a treatment station, said method comprising the steps of first pressure-feeding the flowable mass along an upwardly directed flow path of a fixed cross-sectional area, then feeding the mass along a fixed, generally downwardly directed flow path of reduced cross-sectional area while maintaining the feeding pressure thereby increasing the rate of speed of the mass proportional to the reduction of the cross-sectional area, and finally discharging the accelerated mass below the level of a supply of flowable mass at the treatment station.

3. In an apparatus for producing confections coated with or molded of chocolate, a device for liberating air bubbles contained in a mass of chocolate in flowable condition, said device comprising a treatment station including a storage container for the mass, a first feed pipe of a fixed cross-sectional area for feeding a flow of said mass into said container from a supply of the mass in flowable condition, pressure means for force-feeding the mass through said first pipe, and a second feed-pipe connected to said first pipe and having a smaller cross-sectional area than the first pipe, whereby the flow velocity of the mass in the second pipe is increased proportional to the decrease in the cross-sectional area thereof, said second pipe extending downwardly into said container from the upper portion thereof and terminating near the bottom of the container for discharging the accelerated mass closely adjacent to the bottom of said container.

4. A machine according to claim 3 wherein the ratio of the cross-sectional areas of the first pipe and the second pipe is such that the flow velocity of the mass in the second pipe is about 7 to 15 times higher than in the first pipe.

5. A machine according to claim 3 wherein said first pipe is an upwardly directed pipe and said second pipe is a generally downwardly directed pipe terminating in a generally downwardly facing outlet.

6. A machine according to clam 3 wherein said pressure means comprise a pump included in said first pipe.

References Cited by the Examiner

UNITED STATES PATENTS 1,546,000    7/25    Bausman    107—54.7
2,437,694    3/48    Hickman    259—95

CHARLES A. WILLMUTH, *Primary Examiner.*